United States Patent [19]
Dingwall et al.

[11] Patent Number: 5,128,765
[45] Date of Patent: Jul. 7, 1992

[54] SYSTEM FOR IMPLEMENTING THE SYNCHRONIZED SUPERIMPOSITION OF SUBLIMINAL SIGNALS

[75] Inventors: Robert T. Dingwall, Clinton Corners; Howard T. Bellin, New York, both of N.Y.

[73] Assignee: Visual Subliminal Technologies, Inc., New York, N.Y.

[21] Appl. No.: 277,293

[22] Filed: Nov. 29, 1988

[51] Int. Cl.⁵ ............................................. H04N 5/262
[52] U.S. Cl. .................................................... 358/182
[58] Field of Search ................ 358/181, 92, 142, 183, 358/143, 341, 182; 380/23; 381/73.1, 105, 125; 434/307, 319

[56] References Cited

U.S. PATENT DOCUMENTS 4,230,990 10/1980 Lert, Jr. et al. ...................... 358/84
4,616,261 10/1986 Crawford et al. .................. 358/142
4,777,529 10/1988 Schultz et al. ...................... 358/143
4,807,031 2/1989 Broughton et al. ................. 358/146

*Primary Examiner*—Donald McElheny, Jr.
*Attorney, Agent, or Firm*—Hopgood, Calimafde, Kalil, Blaustein & Judlowe

[57] ABSTRACT

An apparatus and system for the controlled delivery of a subliminal video and/or audio message on to a source signal from a video tape player or similar. The source signal is divided into audio and video portions. A video processor reads sychronization information from the source signal. A controller transmits a stored subliminal image at designated times to a mixer amplifier fully synchronized with the source signal. Concurrently, an audio subliminal message is applied to the source audio at a volume level regulated at some fraction to the source audio. The combined signals are transmitted to a monitor for undistracted viewing.

1 Claim, 3 Drawing Sheets

SYSTEM FOR IMPLEMENTING THE SYNCHRONIZED SUPERIMPOSITION OF SUBLIMINAL SIGNALS

This invention generally relates to a system for processing a subliminal message signal. More particularly, this invention relates to a process and apparatus for superimposing a subliminal signal onto a continuous composite source signal at controlled intervals.

The human cognitive process is often broken down into discrete levels of perception. These range from conscious recognition of outside events down through varying degrees of semi- or unconscious levels of recognition. The factors that contribute to the level of event recognition or perception are numerous and include the duration of the event and the degree of autonomous processing normally associated with the event. For example, many activities reach such a level of instinctive behavior that conscious thought is no longer involved in the individual's reaction to the event; in appearance the reaction process becomes automated. In fact, the individual's reaction to the event is often relegated to subconscious control, as the individual is not consciously aware of his reaction to the event. In this context "event" is used to describe external stimuli to an individual, as perceived by the individual's senses, e.g., sight, hearing, touch, etc.

Subliminal perception involves the recognition by the individual of an event on an unconscious or semi-conscious level, i.e., the individual is conscious, but the level of sensory perception of the event is so low as to only register on the individual's subconscious memory. An example of a subliminal event would be a short duration image of a soft drink presented during an engrossing visual presentation, such as a movie. Since the image of the soft drink is provided for a fraction of a second, the viewer does not consciously perceive the image and continues to focus on the movie. But, the split-second soft drink image is perceived "subconsciously" and initiates a thirst drive in the individual. It is this potential commercial exploitation of subliminal perception that has evoked significant regulation on its use.

The use of subliminal perception has extended into the medical field and is applied for beneficial behavioral modification. For example, instead of an image of a soft drink, the subliminal message may include anti-smoking, or anti-eating symbols or statements. In the case of treating anorexia nervosa, the subliminal symbols will contain enticing visions of food in an attempt to stimulate a subconscious hunger drive. These symbols, received on the subconscious level, will contribute to behavior modification in accordance with an overall treatment. Furthermore, the subliminal message can be applied as an image, a low volume audio, or a combination of both image and audio. Low volume audio, as with the short duration image, is perceived on a lower order of memory and, therefore, not consciously recognized by the recipient.

Television/video systems are ideally suited for subliminal message conduits. In practice the problems involved in adapting the standard video/TV system for medical application of subliminal perception are numerous. To preclude improper use of the subliminal process, the insertion of the subliminal message must be a decentralized operation, i.e., it cannot be part of a central broadcast signal sent to many users. Moreover, the individual must have control of the message for proper application. Inserting the subliminal message locally, as a separate signal to the receiver, has remained troublesome, as the insertion process itself often distorts the source signal. For example, in U.S. Pat. No. 4,616,261, a personal computer is used to turn off the source (i.e., broadcast) signal, insert a subliminal image and then reconnect the source signal. This interference with the source signal will invariably distort the resulting video image in a manner cognizable by the viewer.

It is, therefore, an object of the present invention to provide a subliminal message in the form of a short duration image, as applied during the normal use of a conventional video system.

It is another object of the present invention to provide a simplified apparatus adaptable to a home video system for superimposing a subliminal message locally controlled by the user.

Yet another object of the present invention is to provide an integrated system for superimposing a subliminal image at controlled intervals and a subliminal audio signal at controlled volume onto a source signal.

Still another object of the present invention is to provide a system for superimposing a short duration synchronized subliminal image onto a source video signal without distorting the source signal.

The above and other objects are realized in an apparatus and system for superimposing a subliminal message onto a source signal. The source signal is taken from a suitable discrete device, i.e., television receiver, video cassette recorder, laser disk, etc., in the form of separate audio and video signals. The video signal is processed for horizontal and vertical synchronization information. A controller recalls a video subliminal message from integrated memory and superimposes this message as a video signal, fully synchronized, onto the existing video source signal. In addition, the controller optionally feeds a low volume audio message into the source audio signal, wherein the volume level is regulated at some fractional value of the source audio.

The foregoing features of the present invention may be more fully understood from the following detailed discussion of a specific illustrative embodiment thereof, presented hereinbelow in conjunction with the accompanying drawing, in which.

Figure 1:
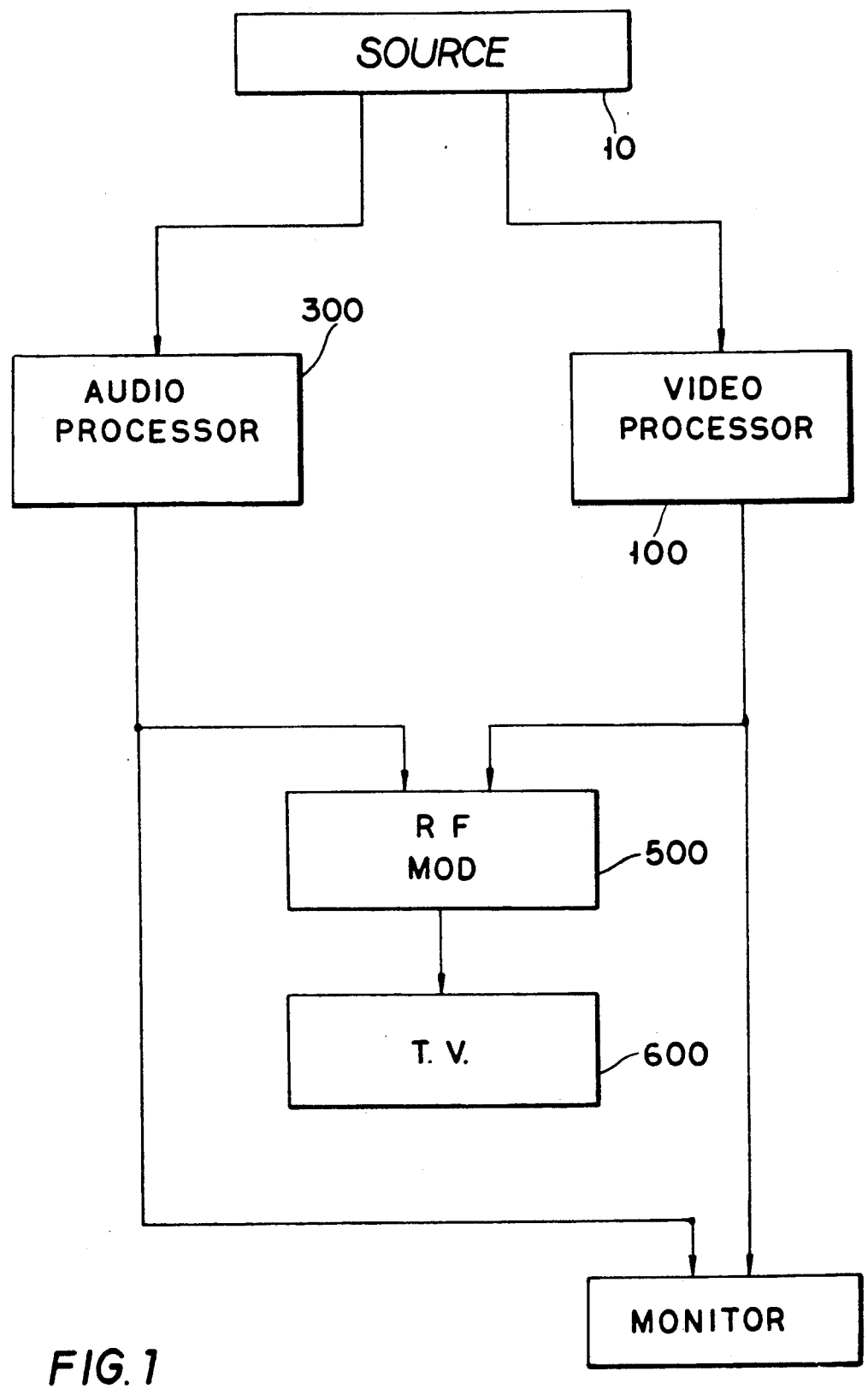
FIG. 1 is a block diagram of the various subsystems of the present invention.

Referring to FIG. 1, the various components of the operative subliminal system are presented. Signal Source 10 represents a source of composite audio/video signal and can be selected from a number of possible devices, including video tape recorders, laser disk players, television receivers, and personal computers. The output signal from Signal Source 10, is a divisible audio/video transmission, carrying the source image and sound information. The video portion of this source signal is transmitted to the video processor, 100, while the audio portion is transmitted to the audio processor, 300. Video and audio processors, are shown in more detail in FIGS. 2 and 3, respectively.

Figure 2:
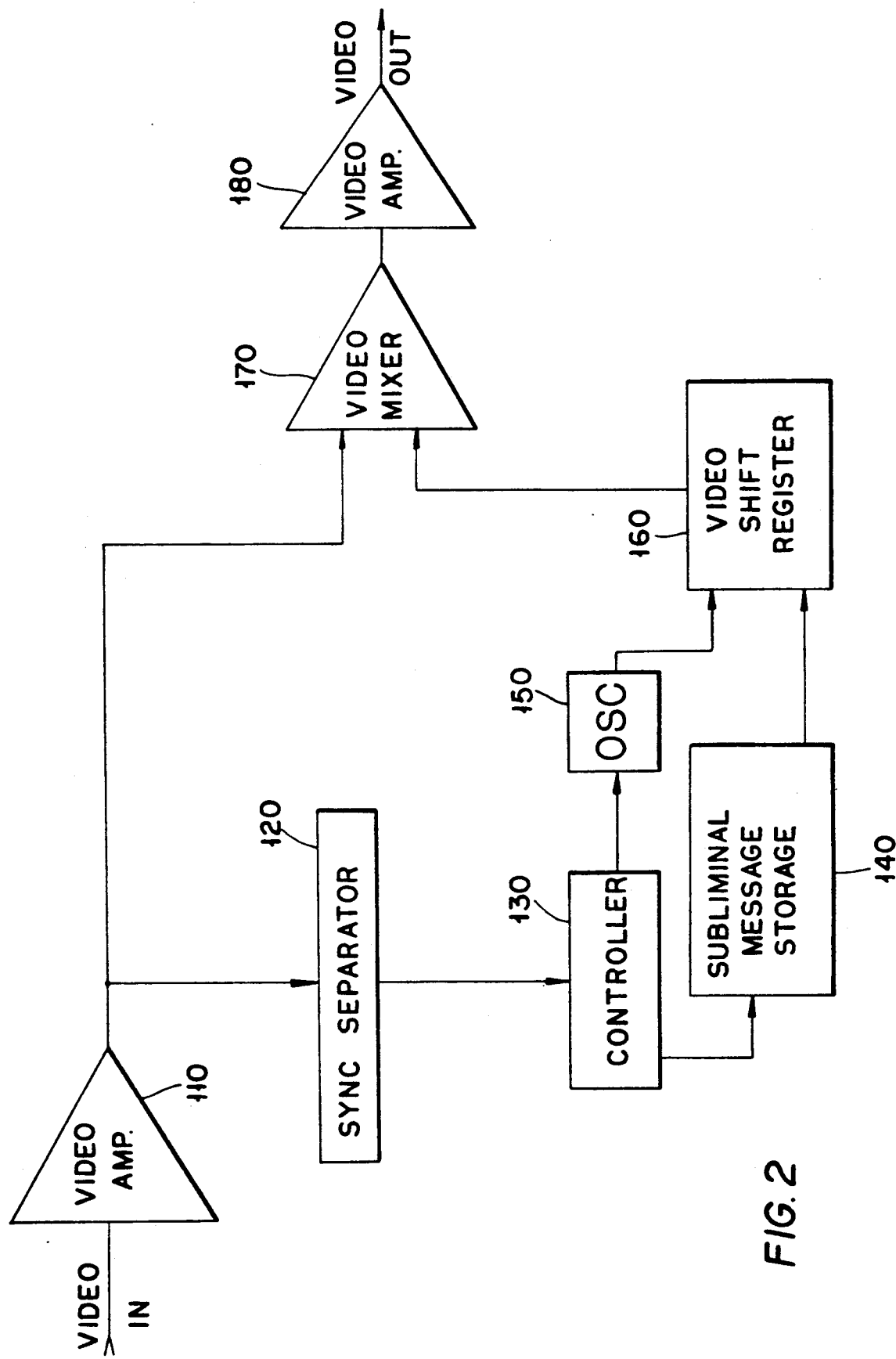
FIG. 2 is a schematic diagram of the video processing subsystem of the present invention.

Referring now to FIG. 2, the video signal is transmitted to buffer amplifier 110, split into parallel paths, and directed to the video mixer 170 and sync separator 120.

The sync separator retrieves the vertical and horizontal synchronization signals from the video signal.

As an aside, it is per se well-known that a video signal of a raster image incorporates vertical and horizontal synchronization information. This information is processed by the receiver to control the start of the raster image scan in terms of initializing each horizontal line and new frame. The industry recognized raster image is horizontally scanned at a rate of 30 image frames per second.

Continuing with FIG. 2, the subliminal video image is processed by controller 130. In this regard, controller 130 has an input means for receiving and storing instructions regarding the insertion of the subliminal video image. These instructions include time of image insertion, selection of image, and other variations as per system features. Controller 130 is connected to video image storage 140 and to oscillator 150. As described above, the incoming synchronization signal to controller 130 is separately read for both vertical and horizontal information. A comparator in controller 130 tracks the synchronization signal and controls the output of image storage 140 based thereon.

Image storage 140 comprises video buffer memory in the form of read only memory (ROM) circuitry. The ROM circuits store one or more subliminal images. These images are stored digitally as a matrix of pixels locations and intensities. In this way, the ROM storage acts as a permanent frame buffer, storing in single frame format, a digitally encoded subliminal message image. Other image storage systems can be applied in a like manner. For example, random access memory (RAM) can be applied as a volatile source of the subliminal image, that can be modified or changed by simple erasure and reprogramming. Alternatively, magnetic or optical storage devices can be used for image storage, in either digital or analog form. Pursuant to a drive signal from controller 130, the stored image in ROM storage 140 is dumped into video shift register 160. Concurrent with this transfer, oscillator 150 provides a synchronized harmonic input to register 160 and thereby controls the synchronized output of the subliminal image in proper video format for mixing in video mixing amplifier 170.

Video shift register 160 operates by receiving the subliminal image message as a stream of, e.g., 8 bit digital image segments from ROM storage 140, and converts the digitally encoded information to the compatible video image signal. The converted image signal is transposed onto an analog carrier, received in parallel, from oscillator 150, forming a system compatible video signal. This signal is then mixed with the source signal at mixer amplifier 170.

As can be seen, the above arrangement provides the subliminal image as a single frame superimposed on source video via video mixer 170. The use of the horizontal and vertical synchronization information from the source signal insures that the subliminal image frame is fully synchronized with the source thereby preventing distortion of the source image as perceived by the viewer. Furthermore, the synchronization signal from the source video can act as a counter and clock, controlling the timed release of the subliminal image pursuant to the stored instruction within controller 130. The video signal with intermittent subliminal message passes to output amplified 180, and is directed to an appropriate output device.

Figure 3:
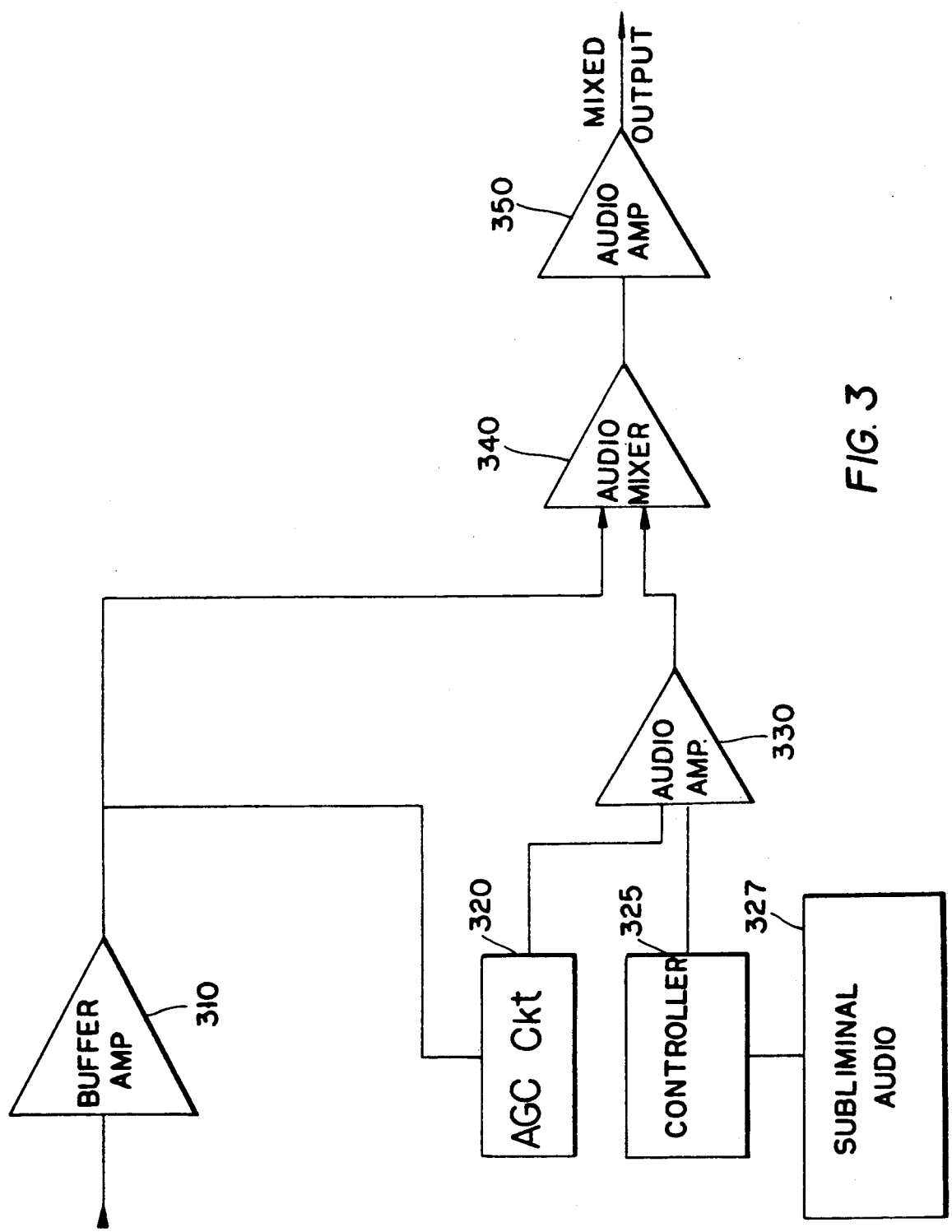
FIG. 3 is a schematic diagram of the audio processing subsystem of the present invention.

Referring now to FIG. 3, the audio processing portion of the subject system is described in detail. As in the video system, the audio input from the source signal is fed to a buffer amplifier 310. The output of buffer amplifier 310 is directed, in parallel, to audio mixer 340 and automatic gain control circuit (AGC) 320. AGC 320 monitors the intensity of the source audio signals.

The subliminal audio signal is retrieved from storage 327, vis-a-vis controller 325. The storage device is typically a magnetic tape drive containing the subliminal audio message. As with the video image storage, other storage devices, such as optical or electronic can be substituted. The subliminal audio signal can run intermittently or continuously, as directed by the instructions stored in controller 325. The subliminal audio signal is fed to AGC amplifier 330 wherein the signal strength is regulated to some fractional value of the source audio signal. More specifically, AGC circuit 320 monitors the source intensity and adjusts the subliminal audio signal intensity to insure that the subliminal message is of significantly lower intensity compared to the source signal; otherwise, the listener would consciously perceive the subliminal message, during quiet moments in the source audio.

Output from AGC amplifier 330 is mixed with the original audio source at mixer amplifier 340; the combined audio signal is fed to output amplifier 350 in preparation for an output device.

Referring back to FIG. 1, the output from video processor 100 and audio processor 300 are directed individually to output devices. If a video monitor is used, 400, the video and audio signals are fed to the video monitor, in their respective demodulated form. For use with a conventional television receiver, the video/audio signals are combined and modulated, at RF (radio frequency) modulator 500. The modulated RF signal from modulator 500 is then transmitted to TV receiver 600 from reception and playback.

The above description has been based on discrete components to enhance understanding of the functional characteristics of the system. Alternatively, various functions can be performed through integrated components. For example, controllers 150 and 325 can be integrated into a single controller for operation of both the audio and video processors. In a similar manner, ROM 140 and storage 327 can be integrated into a single subliminal message storage device for operation in the subject apparatus. Such a unified storage cartridge can be made removable so that the subject system can be made applicable to a variety of behavioral treatments by merely changing the subliminal information storage cartridge.

In operation, the viewer would turn on the source signal 10, activate the audio and video signal processors, and then relax and watch the source presentation. As controlled by the stored or programmed instructions, single frame subliminal images would be intermittently superimposed during the course of the presentation. Since a single raster frame is approximately 1/30 of a second, the viewer would not consciously perceive the image. Additionally, since the superimposed subliminal image is synchronized directly with the source signal, there is no corresponding distortion to the presentation and the image is solely perceived in the subconscious memory of the viewer.

Concurrently, the audio subliminal message is inserted at controlled intervals at a volume constantly maintained at some small fraction of the source audio signal. The subliminal message is delivered to the viewer in a controlled manner.

The above-described arrangement is merely illustrative of the principles of the present invention. Numerous modifications and adaptations thereof will be readily apparent to those skilled in this art without departing from the spirit and scope of the invention.

What is claimed is:

1. An apparatus for superimposing a subliminal video message on a continuous source video signal comprising:

a. means for receiving a source video signal having horizontal and vertical synchronization information;
b. means for detecting said horizontal and vertical synchronization information from said source video signal;
c. means for generating said subliminal video message; and
d. means responsive to said horizontal and vertical synchronization information comprising a video carrier oscillator means and a video shift register means and adapted to superimpose said generated subliminal video message onto said source video signal wherein said subliminal video message is synchronized with said source video signal.

* * * * *